(12) United States Patent
Gerard et al.

(10) Patent No.: US 11,222,143 B2
(45) Date of Patent: Jan. 11, 2022

(54) CERTIFIED INFORMATION VERIFICATION SERVICES

(71) Applicant: International Business Machines Corporation, Armonk, NY (US)

(72) Inventors: Scott Gerard, Wake Forest, NC (US); Donna K. Byron, Petersham, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 321 days.

(21) Appl. No.: 16/215,845

(22) Filed: Dec. 11, 2018

(65) Prior Publication Data

US 2020/0184109 A1 Jun. 11, 2020

(51) Int. Cl.
*G06F 21/64* (2013.01)
*H04L 29/06* (2006.01)
*H04L 9/32* (2006.01)

(52) U.S. Cl.
CPC .......... *G06F 21/645* (2013.01); *H04L 9/321* (2013.01); *H04L 63/08* (2013.01)

(58) Field of Classification Search
CPC ....... G06F 21/645; H04L 63/00; H04L 63/08; H04L 9/321
USPC .......................................................... 726/6
See application file for complete search history.

(56) References Cited

U.S. PATENT DOCUMENTS

| 6,327,656 | B2 | 12/2001 | Zabetian |
| 8,185,448 | B1 | 5/2012 | Myslinski |
| 8,768,782 | B1* | 7/2014 | Myslinski ............... G06F 16/95 705/26.1 |
| 9,483,582 | B2 | 11/2016 | Gaucher et al. |
| 9,495,341 | B1 | 11/2016 | Vagell et al. |
| 2004/0122846 | A1 | 6/2004 | Chess et al. |
| 2014/0188461 | A1* | 7/2014 | Myslinski ............... A63F 13/00 704/9 |
| 2016/0078349 | A1 | 3/2016 | Bryon et al. |
| 2018/0067950 | A1 | 3/2018 | Byron et al. |

OTHER PUBLICATIONS

What is Timestamping? https://www.globalsign.com/en/blog/what-is-timestamping-how-does-it-work Feb. 10, 2017 (Year: 2017).*
Checking how fact-checkers check Chloe Lim Jul. 19, 2018 (Year: 2018).*
What is fact checking and why is it important? by FactCheckNI Nov. 16, 2018 (Year: 2018).*

* cited by examiner

*Primary Examiner* — Benjamin A Kaplan
(74) *Attorney, Agent, or Firm* — Cantor Colburn LLP; Brian Welle

(57) ABSTRACT

Provided are embodiments for a method, system, and computer program product for operating a certified information verification service. Some embodiments include receiving an article including one or more claims, and extracting the one or more claims from the article. The one or more claims are analyzed by the one or more information verification services, and a report for the article is generated based on the analysis.

19 Claims, 8 Drawing Sheets

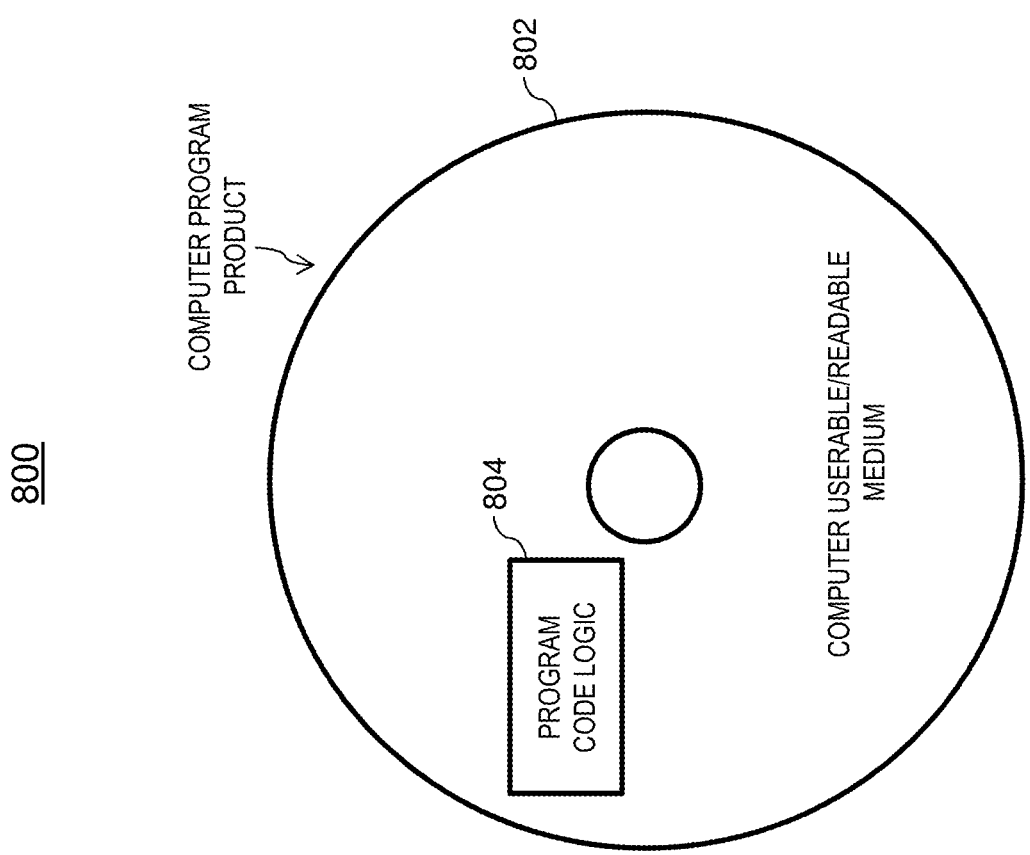

CERTIFIED INFORMATION VERIFICATION SERVICES

BACKGROUND

The present invention generally relates to computers and similar technologies, and more specifically, to a method, system, and apparatus for operating certified information verification services.

With the convenience and availability of the Internet, articles, news, and posts can be published at the click of a button. Readers can receive information through multiple channels such as on their mobile devices, tablets, laptops, etc. The information can be provided on a particular website, social media platforms, etc. In addition, information such as news articles can be shared among friends which further increases the rate the information is spread. Due to the speed at which information is provided it may become difficult for readers to ingest and evaluate the truthfulness of the article. Therefore, there may be a need to validate the claims provided in the article.

SUMMARY

Embodiments of the present invention are directed to a computer-implemented method for operating a certified information verification service. A non-limiting example of the computer-implemented method includes receiving, by a processor, an article including one or more claims, and extracting the one or more claims from the article. The computer-implemented method also includes analyzing, by one or more information verification services, the one or more claims, and generating a report for the article based on the analysis.

Embodiments of the present invention are directed to a system for operating a certified real information verification service. A non-limiting example of the system includes a storage medium, the storage medium being coupled to a processor. The process is configured to receive an article including one or more claims, and extract the one or more claims from the article. The processor is configured to analyze, by one or more information verification services, the one or more claims, and generate a report for the article based on the analysis.

Embodiments of the invention are directed to a computer program product for operating a certified information verification service, the computer program product comprising a computer-readable storage medium having program instructions embodied therewith. The program instructions are executable by a processor to cause the processor to perform a method. A non-limiting example of the method includes receiving an article including one or more claims, and extracting the one or more claims from the article. The method also includes analyzing, by one or more information verification services, the one or more claims, and generating a report for the article based on the analysis.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 8 depicts a computer program product for practicing the teachings herein.

Figure 1:
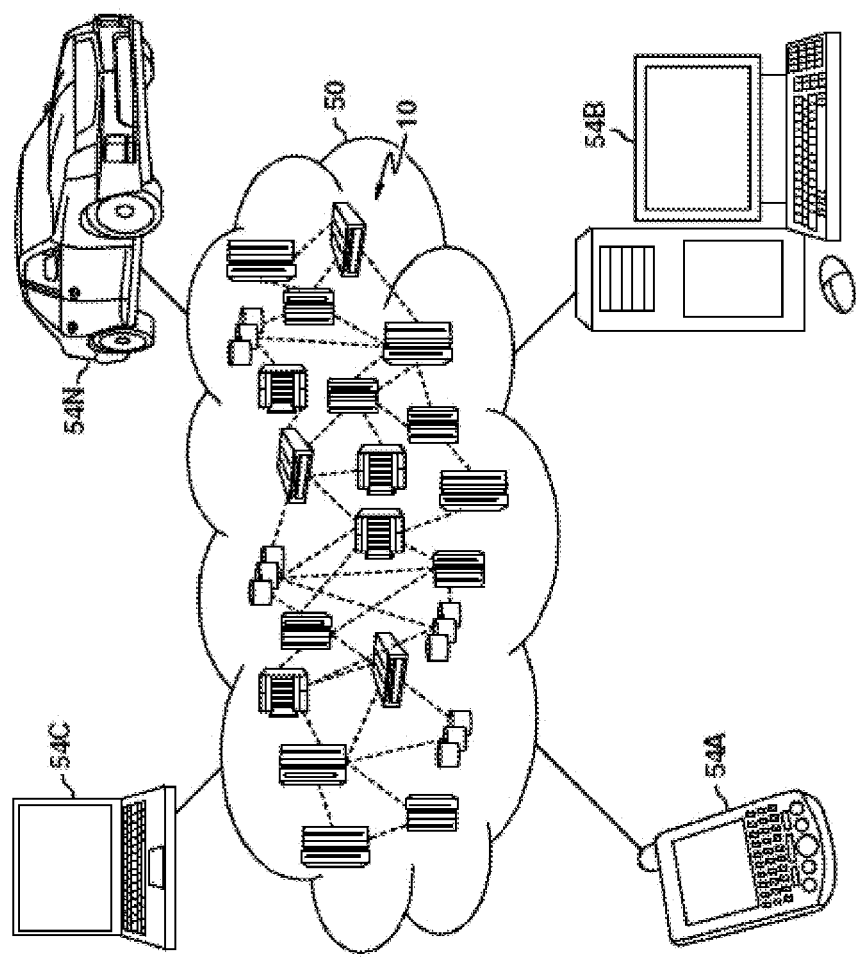
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
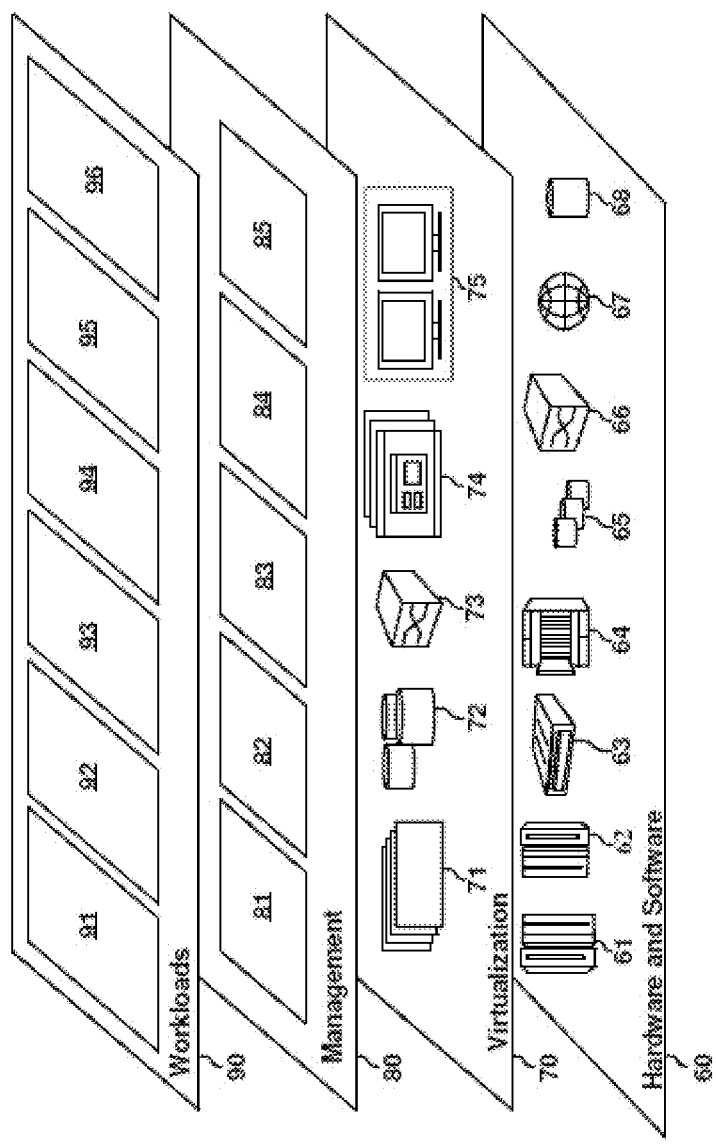
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Figure 3:
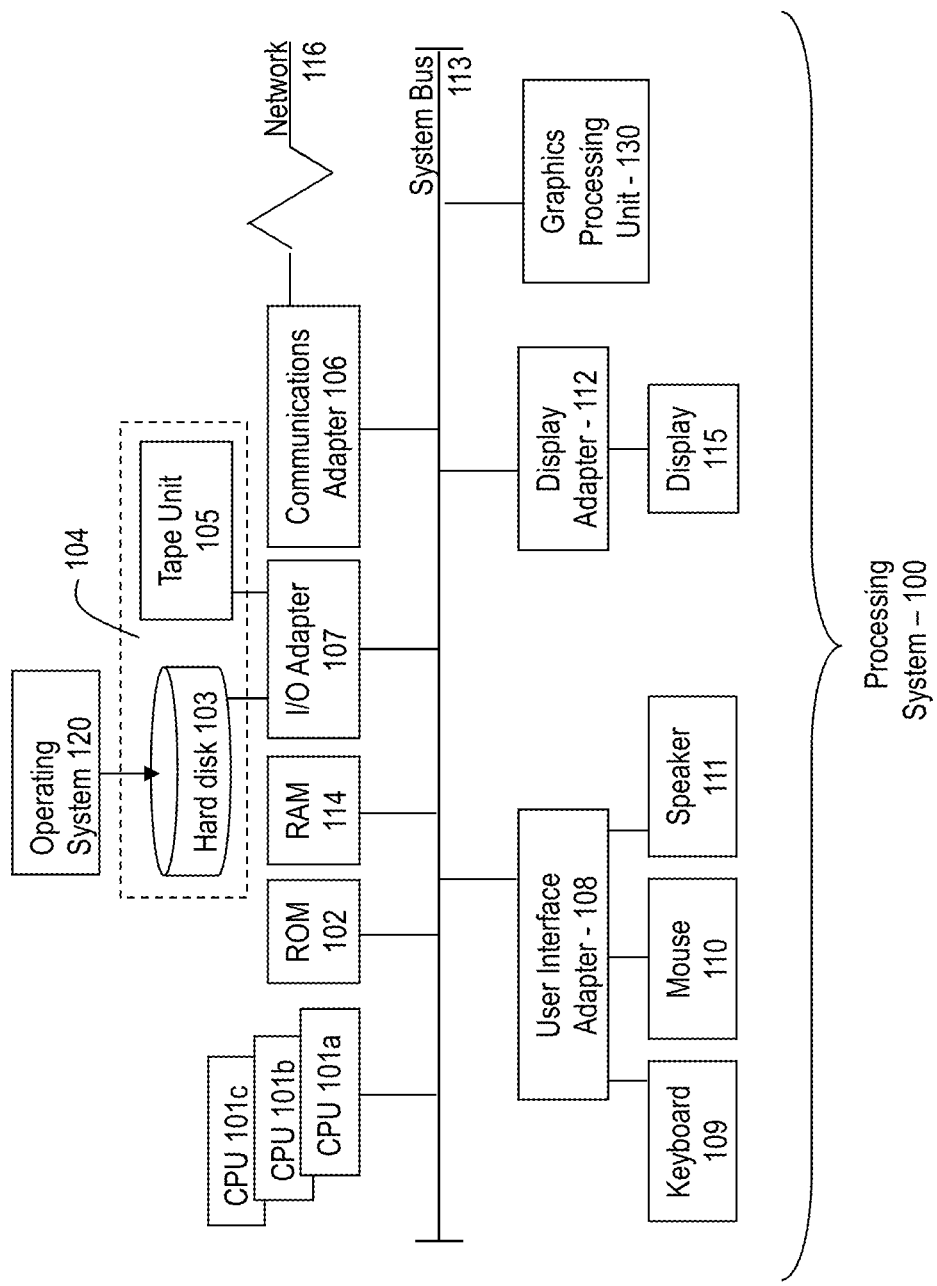
FIG. 3 depicts a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Turning now to an overview of technologies that are more specifically relevant to aspects of the invention, various outlets and sources allow writers to post and publish articles online. The articles usually list the sources that were used and cited when writing the article. The sources are available so that readers of the article can research and evaluate the cited references.

In today's environment, readers can conveniently access several articles that the reader does not properly evaluate the sources used in each of the articles. In other words, readers may not be able to readily determine the trustworthiness of the online website and/or the article. Due to the fast pace of the flow of information, readers may not fully evaluate the content of an article. Especially, if a user has built trust in a particular website over the years. In addition, it may be difficult for the readers to determine references supporting an article in an efficient manner.

Turning now to an overview of the aspects of the invention, one or more embodiments of the invention address the above-described shortcomings of the prior art by providing techniques to evaluate statements or claims of articles using a plurality of information verification services (fact checkers).

The techniques described herein provide for an efficient method that allows a reader to evaluate the sources used in writing an article. In addition, the writer can also quickly evaluate the sources that were cited to ensure a variety and/or reliable set of references were cited. In one or more embodiments of the invention, a report is generated. After receiving the report, the user must weigh, evaluate, and decide on a claim's truth. The techniques described herein assist users in the evaluation process. The techniques described herein include providing support for a claim or providing evidence to refute a claim. The techniques link evidence that has a known scope to individual claims in the evaluated texts, then produces an aggregate summary from those individual judgments in the report.

Figure 4:
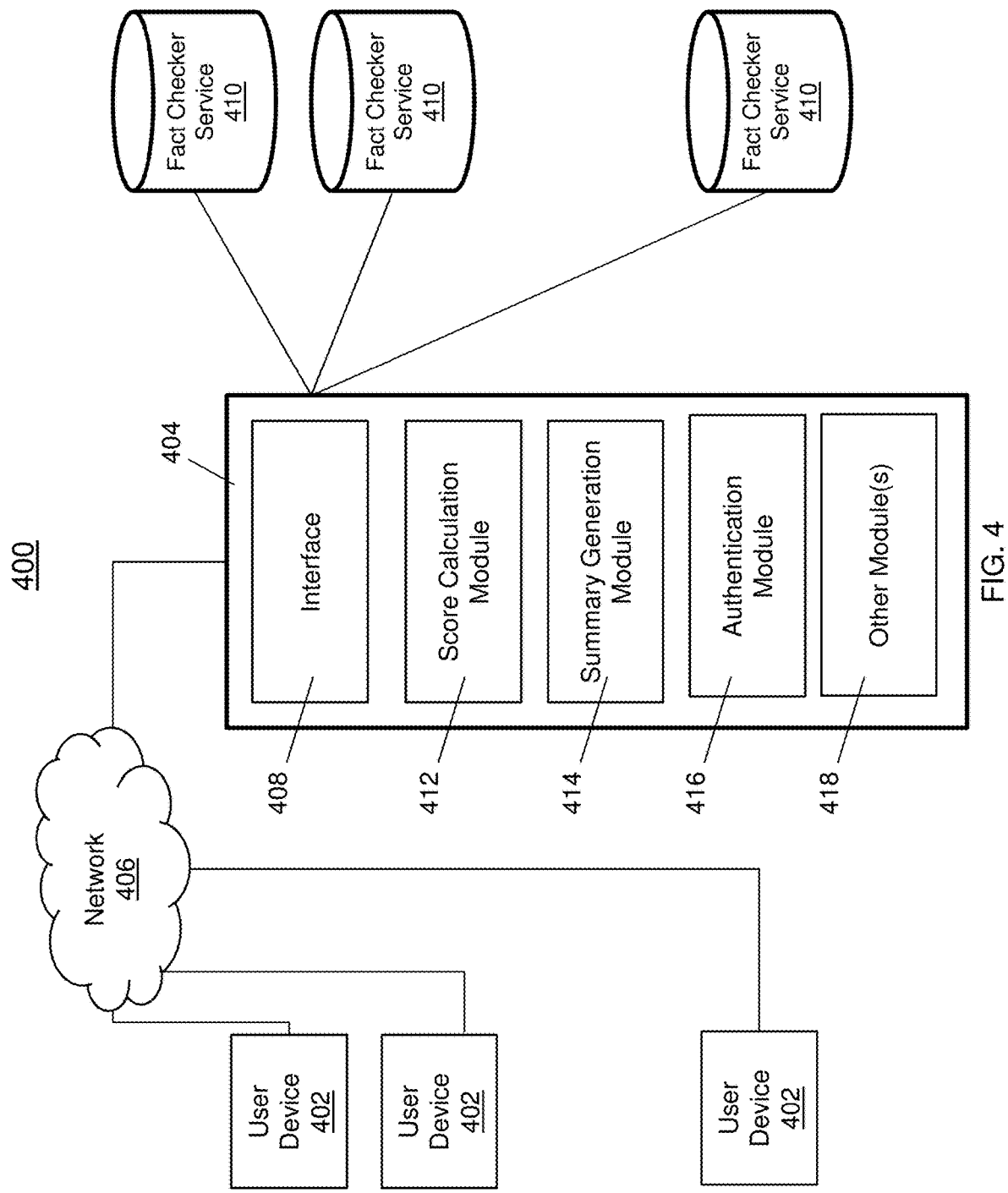
FIG. 4 depicts a system for operating a certified information verification service in accordance with one or more embodiments.

Turning now to a more detailed description of aspects of the present invention, FIG. 4 depicts a system 400 for operating a certified information verification service in accordance with one or more embodiments of the invention. The system 400 includes a user device 402 such as a mobile device, computer device, tablet, etc. the user devices 402 allows a user, to write an article and provide it to a server 404 over the network 406 to analyze the article. In one or more embodiments of the invention, a speech, a transcript, or other type of audio, text, and content can be provided to the server 404 for analysis.

The server 404 includes an interface 408 to communicate with user devices 402 or other devices/systems. The server 404 can include a segmentation module that is configured to receive the input and process the input by parsing/segmenting the audio/text that has been received. Known techniques can be used to segment the input that is received at the interface 408. For example, the segmentation operations include sentence segmentation, text segmentation, or a combination thereof, where one or more claims are extracted from the input. Those skilled in the art will be aware that most written languages have punctuation marks which occur at sentence boundaries and those boundaries can be used to extracting the one or more segments of the input.

The system 400 includes information verification service 410 that can perform operations related to information verification services such as a fact checker service. The information verification service 410 includes a corpus of references that can be used to provide support for a claim. In other embodiments, the corpus can be used to refute a claim. The corpus can include different types of documents. The operations that are performed by the information verification services 410 are described below with reference to FIG. 5.

The information verification services 410 can be associated with a news source or outlet. A first information verification service can be associated with a first news source, a second information verification service can be associated with a second news source, and so on. Each of the information verification services 410 can include a corpus that is associated with a particular news source.

The interface 408 is configured to receive the information from the information verification service 410 such as the processed information including an article score, cited references, etc.

The server 404 includes a score calculation module 412. The score calculation module 412 is configured to aggregate the scores provided by each information verification services 410. In one or more embodiments of the invention, each of the fact-checker services may be associated with their own rating or scoring mechanism. A normalization function can be applied to each of the individual rating mechanisms so that the total aggregated score can be calculated.

In one or more embodiments of the invention, the users can weigh the scores for each information verification services 410. For example, a user might favor a first source (weight=1), partially accept a second source (weight=0.5), and dislikes another source (weight=0), while another user may configure the weights differently.

After each of the fact checker services has evaluated the claims and provided a score that has been normalized, an aggregated score for the article can be provided such as an average score for all of the information verification services having the user applied weights.

The system 400 also includes a summary generation modules 414 that is configured to generate a report for the article. The summary report can include a percentage of the document's claims that were completely or partially verified to indicate the strength of support for the document. For example, a piece that is mostly an opinion (subjective in nature), description of future states, or unintelligible may be labeled as unverified rather than a false claim. That is, in some scenarios, claims will have no matching corpus references which indicate that a particular fact checker's corpus makes no claim to either the truth or falsity of the claim.

The authentication module 416 is configured to digitally authenticate the report after it has been generated to prevent tampering or manipulation of the data in the report. The authorization can include a date the report was generated. Because the fact checker corpus can be dynamically updated, the date of the report is provided.

It should be understood that other modules 418 can be included in the server 404. In other embodiments of the invention, one or more modules and/or functions can be performed internally or externally to the remote server, or a combination thereof.

Figure 5:
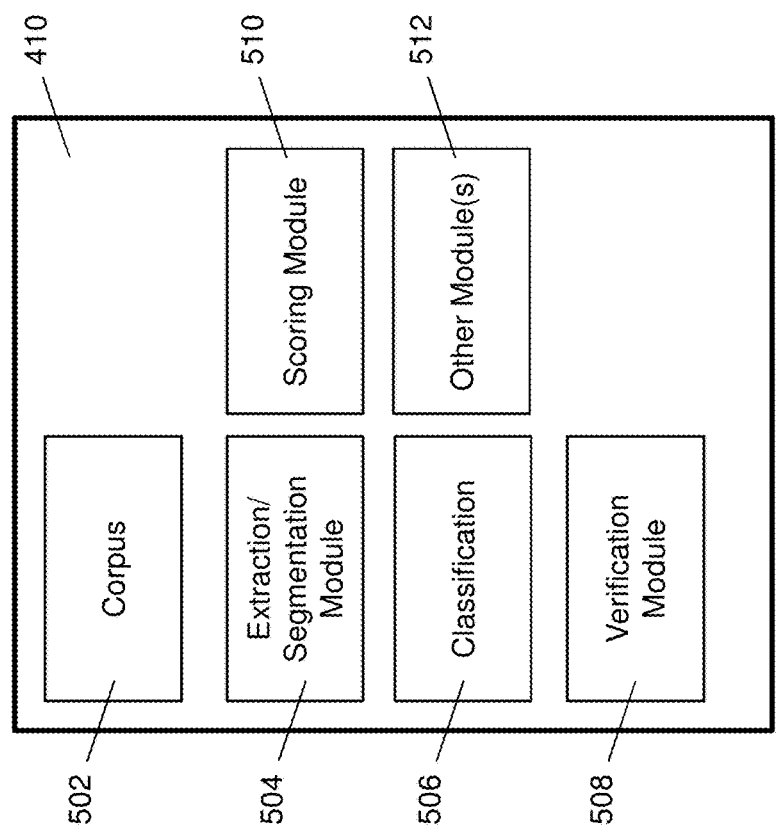
FIG. 5 depicts a fact checker used in a certified information verification service system in accordance with one or more embodiments.

FIG. 5 depicts an information verification service system 500 in accordance with one or more embodiments of the invention. In one or more embodiments of the invention, claims are evaluated by multiple information verification services 410, each with its own corpus 502 of information and references. Each corpus 502 includes its own references and sources that are used in the claim analysis. In one or more embodiments of the invention, a user can select one or more information verification services 410 to analyze and evaluate the input.

After each of the claims is segmented, by a segmentation module 504, a classification process is performed by the classification module 506. In other embodiments of the invention, the server 404 can perform the sentence extraction and segmentation and transmit the data to the information verification services for analysis or the comparison can be performed in the server 404 by obtaining information from the corpus of the information verification service.

In one or more embodiments of the invention, the claims can be classified as a claim that is subjective in nature or objective in nature. The claims can be classified by identifying keywords that are related to objective and subjective claims. It should be understood that known classification schemes can be used. In addition, after analyzing the objective claims the claims can be labeled as true or false. In the event the claim can neither be supported nor refuted, the system 400 can classify the claim as unverifiable.

Next, the verification module 508 is configured to compare each of the claims that have been classified as objective in nature to the corpus. The comparison is performed to find support for the objective claim or refute the objective claim.

In one or more embodiments, the objective claims are compared to a corpus of texts to verify the claims. In one or more embodiments of the invention, the subjective claims can be further analyzed.

Each of the objective claims are compared with the corpus of each of the information verification services 410. The techniques described herein do not necessarily require knowledge of whether the assertion is or is not actually a truthful claim.

In one or more embodiments of the invention, a processing module may be provided as an application program interface (API) or a Natural Language Processing (NLP) API. NLP allows computers to interpret and manipulate human language. The API can be configured to parse sentences to process the relationship between words in the parsed sentences. The extracted sentences are further analyzed based grammatical rules, semantic rules, and the contextual rules associated with the words of the sentences. The output of the API can be optimized by using machine-learning techniques to further refine the results of the NLP. The machine-learning techniques use statistical inference to automatically learn rules through the analysis of large corpora of real-world examples. As more and more data is provided to the processor, more rules can be determined to provide further understanding of the extracted sentences. The machine-learning techniques can identify patterns in words of sentences and leverage the relationships by comparing the input text/speech to that of the data stored in a database to understand the language. It should be understood that NLP can be performed to ascertain the objective claims and subjective claims in accordance with one or more embodiments. In addition, it should be understood that the NLP is used to compare the input claims to the references that are stored in the one or more corpora to support or refute the claims and can be used to calculate a score. The processing performed by the example described here are illustrative and does not limit the scope of the invention.

The scoring module 510 can provide a score based on matching the segmented claim with support in the corpus or providing a source refuting the segmented claim. Subsequently, each of the information verification services 410 sends information to the server 404 including identifying information of the information verification service, a score, the sources provided for each claim, etc. The results are processed by the server 404 to generate the report. It should be understood that other modules 512 can be incorporated in the information verification service 410.

Figure 6:
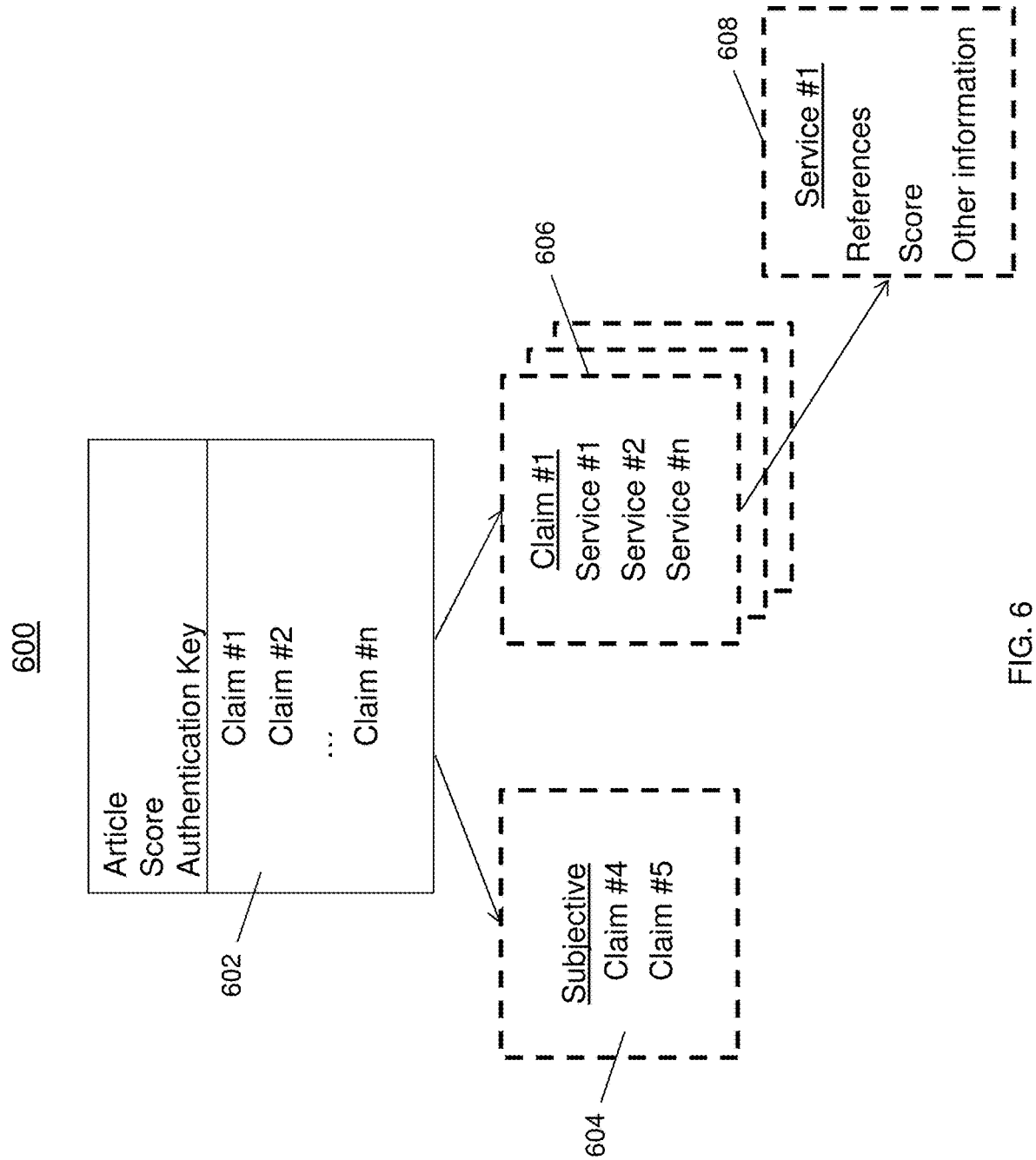
FIG. 6 depicts an example result of performing a certified information verification service in accordance with one or more embodiments.

Referring now to FIG. 6, an example of a summary 600 generated from the information verification services 410 in accordance with one or more embodiments of the invention is shown. FIG. 6 includes an article 602. In an example, the article 602 includes a number of claims #1, #2 . . . #n. In a non-limiting example, the article 602 can include the following claim, "John Doe is a friendly American and wonderful diplomat with a big mustache." The server 404 or the information verification service 410 segments the claims of the article. In a non-limiting example, the following segments have been identified: Claim #1-John Doe is American; Claim #2-John Doe is a diplomat; Claim #3-John Doe has a big mustache; Claim #4-John Doe is friendly; and Claim #5-John Doe is wonderful.

The server 404 or the information verification service 410 proceeds to classify the segmented claims into objective claims 606 and subjective claims 604. Claims #1-3 have been determined as the objective claims 606 and are further processed by the by the information verification service 410. The objective claims 606 are then compared to the data in one or more corpora to determine if the claims are supported or refuted by the information contained in the corpora. The comparison can use the sentiment and tonal analysis described above to determine a matching reference or a refuting reference. Then, references for each of the claims are returned to the server 404 and an article score and summary are generated. Claim #4-John Doe is friendly and Claim #5-John Doe is wonderful are subjective claims and would not be processed in this example. As shown in FIG. 6 for each objective claim 606, the references supporting that claim, article score, and other information can be provided in the report from each information verification service 410 as provided in block 608.

In an example, a user can select which information verification service 410 are to be used in the analysis. In this example, four fact checker services can be selected where each of the services shows agreement on the first three claims.

The overall score for the article can include an average of each of the scores provided by the information verification service 410. In one or more embodiments of the invention, the score can be updated by human fact-checkers as well as the automated process of generating scores.

The server 404, receiving each of the references and scores for the respective corpora can generate a report. After the report is generated the report is authenticated and provided to one or more users. It should be understood the information can be presented to a user in a number of ways and is not limited by the example shown in FIG. 6.

Figure 7:
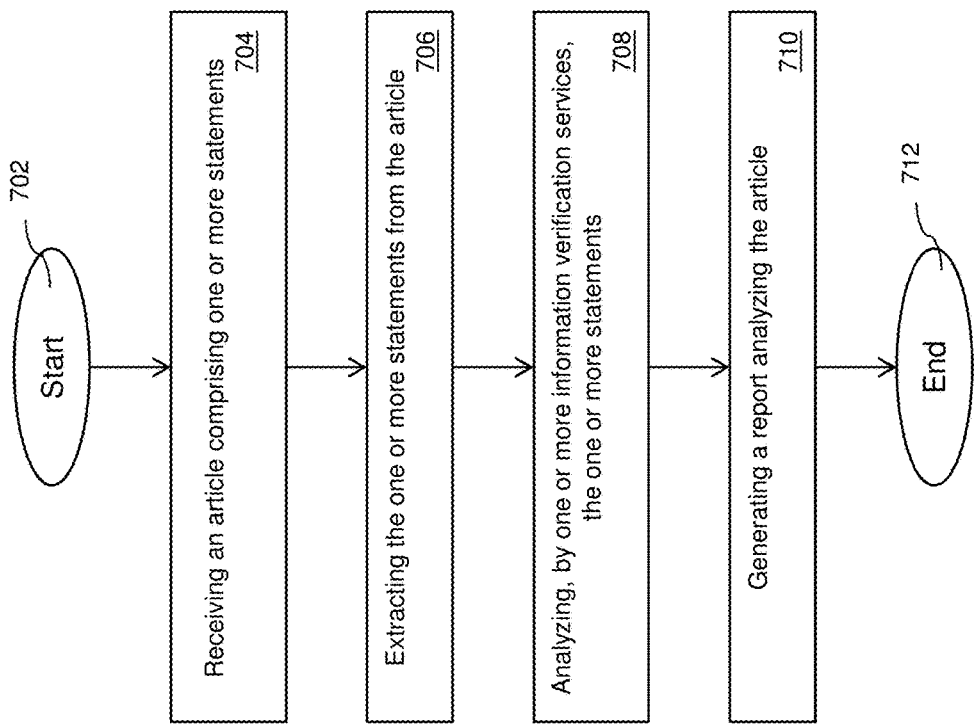
FIG. 7 depicts a flowchart for operating a certified information verification service system in accordance with one or more embodiments.

Now referring to FIG. 7, a flowchart of a method 700 for operating a certified information verification service in accordance with one or more embodiments of the invention. The method 700 begins at block 702 and proceeds to block 704 which provides for receiving, by a processor, an article including one or more claims. In one or more embodiments of the invention, the input to the system can include other input such as audio from a speech, a transcript, other types of documents, etc. Block 706 provides for extracting one or more claims from the article. Block 708 provides for analyzing, by one or more information verification services, the one or more claims. In one or more embodiments of the invention, the analysis includes classifying the claims as objective claims and subjective claims. The analysis also includes comparing the objective claims with the corpus of references provided in one or more information verification services. Block 712 provides for generating a report for the article based on the analysis. The method 700 ends at block 714.

Referring now to FIG. 8, a computer program product 800 in accordance with an embodiment that includes a computer-readable storage medium 802 and program instructions 804 is generally shown.

The techniques described here improve over the prior art by allowing writers and readers to quickly and efficiently identify sources used as references to evaluate the trustworthiness of the article citing those references. In one example, a user (writer) can select the most verification sources to evaluate the claims of the article. Based on the results, the user can re-write the article to reflect a more accurate portrayal of facts. In another example, the reader can determine the objectivity of the article based on the cited references.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method operating a certified information verification service, the computer-implemented method comprising:

receiving, by a processor, an article including one or more statements;

extracting the one or more statements from the article;

analyzing, by one or more information verification services, the one or more statements, wherein analyzing the one or more statements comprises classifying the one or more statements as objective statements or subjective statements; and generating a report for the article based on the analysis on the one or more statements classified as the objective statements, wherein the report includes a value that is a percentage of the one or more statements that have been verified.

2. The computer-implemented method of claim 1, further comprising returning a list of references for each statement of the one or more statements of the article.

3. The computer-implemented method of claim 1, wherein the generated report comprises scores from one or more information verification services.

4. The computer-implemented method of claim 1, wherein the generated report comprises corroborating references and refuting corpus references for each segmented statements.

5. The computer-implemented method of claim 1, further comprising applying a weight to scores from one or more information verification services.

6. The computer-implemented method of claim 1, further comprising determining a total score using the scores from one or more information verification services.

7. The computer-implemented method of claim 1, further comprising selecting one or more information verification services.

8. The computer-implemented method of claim 1, further comprising authenticating the generated report including a private key and a date, wherein the authentication restricts edits to the generated report.

9. A system for operating a certified information verification service, the system comprising:

a storage medium, the storage medium being coupled to a processor;

the processor configured to:

receive an article including one or more statements;

extract the one or more statements from the article;

analyze, by one or more information verification services, the one or more statements, wherein analyzing the one or more statements comprises classifying the one or more statements as objective statements or subjective statements; and generate a report for the article based on the analysis of the one or more statements classified as the objective statements, wherein the report includes a value that indicates a percentage of the one or more statements that have been verified.

10. The system of claim 9, wherein the processor is further configured to return a list of references for each statement of the one or more statements of the article.

11. The system of claim 9, wherein the generated report comprises scores from one or more information verification services.

12. The system of claim 9, wherein the generated report comprises corroborating references and refuting corpus references for each segmented statements.

13. The system of claim 9, wherein the processor is further configured to apply a weight to scores from one or more information verification services.

14. The system of claim 9, wherein the processor is further configured to select one or more information verification services; and determine a total score using the scores from one or more information verification services.

15. The system of claim 9, wherein the processor is further configured to authenticate the generated report including a private key and a date, wherein the authentication restricts edits to the generated report.

16. A computer program product for operating a certified information verification service, the computer program product comprising a computer-readable storage medium having program instructions embodied therewith, the program instructions executable by a processor to cause the processor to:

receive an article including one or more statements;

extract the one or more statements from the article;

analyze, by one or more information verification services, the one or more statements, wherein analyzing the one or more statements comprises classifying the one or more statements as objective statements or subjective statements;

generate a report for the article based on the analysis of the one or more statements classified as the objective statements, wherein the generated report comprises scores from one or more information verification services, wherein the report includes a value that indicates a percentage of the one or more statements that have been verified; and authenticate the generated report including a private key and a date, wherein the authentication restricts edits to the generated report.

17. The computer program product of claim 16, wherein the instructions are further executable by the processor to cause the processor to generate a list of references for each statement of the one or more statements of the article.

18. The computer program product of claim 16, wherein the generated report comprises corroborating references and refuting corpus references for each segmented statements.

19. The computer program product of claim 16, wherein the instructions are further executable by the processor to cause the processor to select one or more information verification services;

apply a weight to scores from one or more information verification services; and determine a total score using the scores from one or more information verification services.

* * * * *